United States Patent

[11] 3,620,757

| [72] | Inventors | Rudolph H. Ellinger<br>New Canaan, Conn.;<br>Mark G. Schwartz, Yonkers, N.Y. |
|---|---|---|
| [21] | Appl. No. | 744,678 |
| [22] | Filed | July 15, 1968 |
| [45] | Patented | Nov. 16, 1971 |
| [73] | Assignee | Stauffer Chemical Company<br>New York, N.Y. |

[54] REPLACEMENT OF SODIUM CASEINATE
23 Claims, No Drawings

[52] U.S. Cl. .................................................. 99/54,
99/57, 99/63, 99/116, 99/117, 99/136, 99/139
[51] Int. Cl. ..............................................A23c 23/00,
A23c 13/12, A23c 19/12
[50] Field of Search........................................... 99/54, 57,
63, 94, 139

[56] References Cited
UNITED STATES PATENTS

| 2,923,628 | 2/1960 | Otto | 99/63 |
|---|---|---|---|
| 3,201,245 | 8/1965 | Clark et al. | 99/57 |
| 3,269,843 | 8/1966 | McKee et al. | 99/94 |
| 3,356,507 | 12/1967 | Wingerd | 99/139 |
| 3,458,319 | 7/1969 | Block et al. | 99/63 X |

OTHER REFERENCES

Webb et al., The Utilization of Whey: A Review. J. Da. Sci. Vol. 31, No. 2. Feb., 1948 (pages 154– 157) SF22158.

*Primary Examiner*—Lionel M. Shapiro
*Assistant Examiner*—D. M. Naff
*Attorneys*—Paul J. Juettner, Wayne C. Jaeschke and Martin Goldwasser ABSTRACT: Compositions of dry whey solids and alkali polyphosphates are provided which exhibit functional properties in food compositions as well as nutrient value. The polyphosphate is present in an amount of at least one percent based on protein and the polyphosphate desirably has a $P_2O_5$ content of 66 percent or greater. These compositions are preferably used as replacement, total or partial for sodium caseinate in nonbutterfat dairy products.

REPLACEMENT OF SODIUM CASEINATE

This invention relates to compositions of dry whey solids and inorganic phosphates. More particularly, this invention relates to dry mixtures of whey solids and certain phosphate salts which impart desirable functional properties to whey thereby permitting its use in food applications where it was heretofore unsuitable.

The compositions of this invention are useful in various food compositions particularly those containing fat. Areas of particular utility include both liquid and powdered coffee whiteners, whipped toppings, filled milk and imitation milk.

As a byproduct of cheese production, whey has long been discarded as waste. In recent times world-wide shortages of protein have directed a considerable effort to the recovery of whey protein as a food source. While a relatively small proportion of whey is utilized in animal feed, and a proportion is dried and utilized for human consumption, a large proportion of whey is still discarded as waste. This has resulted not only in a loss of recoverable protein as a food source but has also contributed to the pollution of many streams, lakes and rivers.

The very composition of whey has historically mitigated against its use as a food source. Whey contains only from about 5 to about 10 percent solids, and the remainder being water. Thus, to even produce dry whey solids, a disproportionately large amount of water must be removed. Large scale drying techniques have in recent years been developed, however, which make the production of dry whey solids both technically possible and economically feasible. A very large proportion of the dried whey produced, however, still is utilized as animal feed. Utilization of dried whey in food compositions for human consumption has not proved feasible because of the functional deficiencies inherent in the dry whey solids themselves.

One particular food area where the use of whey has proven functionally deficient is in nonbutterfat containing dairy product compositions such as the coffee whiteners, whipped toppings, and the like. While such products could theoretically utilize dry whey solids, they have been found functionally deficient. Dry whey used in nonbutterfat coffee whitener compositions for example, results in products which exhibit oil separation, and feathering in hot coffee. While this is nutritionally unimportant, it is aesthetically unacceptable. Liquid coffee whiteners utilizing dried whey exhibit not only the foregoing deficiencies but additionally are subject to phase separation which again is also unacceptable from a market standpoint.

Accordingly, it is believed that the present invention which overcomes the inherent problems in the use of dry whey solids in food applications represents a considerable advance in the art which could effect the utilization of unused protein and consequentially reduce somewhat the pollution of the streams and rivers into which the greater portion of liquid whey is conveniently discharged as waste.

In accordance with the present invention, dry whey solids have been found to be functionally suitable for use in nonbutterfat dairy products by simple admixture with a particulate alkali metal polyphosphate wherein the alkali metal ion has a molecular weight greater than 10 and less than 50, i.e., sodium or potassium.

The linear alkali metal polyphosphates suitable for use in this invention are those having a $P_2O_5$ content of 66 percent or higher. Illustrative of the linear alkali metal polyphosphates are the sodium hexametaphosphates (Graham's salt) and potassium polymetaphosphates.

The linear sodium polyphosphates generally have an average chain length of from about 10 to about 100 although those having an average chain length of from about 12 to about 35 are preferred. The potassium polyphosphates generally have average chain lengths from about 1,000 to about 10,000. Mixtures of the linear alkali metal polyphosphates can, of course, be used in this invention.

Whole liquid whey is the liquid normally obtained from the manufacture of cheese. This liquid is residual from the after the formation and removal of the curds. The whole liquid whey contains protein, principally lactoglobulin and lactalbumin, soluble salts or minerals of the milk, fat, lactose and a large amount of water. While the composition of whole liquid whey vary somewhat in respect to the particular cheese making process from which it derived, the following approximate composition of whole liquid whey is illustrative and generally representative.

| Constituent | Approximate Percent by Weight |
| --- | --- |
| Water | 93.2 |
| Protein | 0.9 |
| Lactose | 5.1 |
| Fat | 0.3 |
| Minerals | 0.5 |

Whole liquid whey generally contains approximately 7 percent by weight solids. The whole whey solids are obtained by removing water from the whole liquid whey. This drying operation can be effected by several processes. For example, the whole liquid whey can be dried directly by conventional techniques to provide whole dry whey solids or prior to drying some or all of the nonprotein components can be removed.

It is an important feature of this invention that dry whey can be used containing all the solid components of the liquid whole whey to 100 percent dry whey protein. Accordingly, it is intended that for purposes of this invention dry whey solids include dry whey containing up to 100 percent whey protein. Whole dry whey generally contains at least 5 percent by weight and usually about 12 percent by weight whey protein but this amount can vary depending on such factors as the milk source, the cheese process, and the like.

The amount of linear alkali metal polyphosphate utilized in the whey composition of this invention will vary slightly depending upon the particular dry whey solids employed and the particular recipe in which they are to be used. In general, however, amounts of at least 1.0 percent based on the percent whey protein are satisfactory although it is preferred that amounts from about 10 to about 40 percent be used and most preferred that amounts from about 25.0 to about 35 percent be used. Slight adjustment well within the skill of the art may be desirable to achieve optimum performance in any given formulation.

Ratios of 5:1 protein to phosphate by weight to ratios of 3:1 are preferred based on economic consideration and optimum effectiveness, although higher and lower ratios can be employed.

The whey polyphosphate compositions of this invention are formed by the simple admixture of the component ingredients. It is, of course, desired that these mixtures be thoroughly blended to provide a uniform mixture. Any conventional blender or mixers suitable for blending dry powders can be used provided, of course, they meet the general requirements of food processing.

In respect to particle size of the whey polyphosphate mixture, there are no critical requirements, although it is desirable that the phosphate and whey particles be of relatively similar size to avoid gravity separation in transit. A whey polyphosphate mixture having particle sizes of from about 80 mesh to about 125 mesh has been found to be quite suitable, although larger and smaller particle sizes can be employed if desired.

The mixtures of this invention, as indicated above, are useful in nonbutterfat dairy products and it has been found that they are particularly useful in those areas wherein sodium caseinate has been heretofore used. The mixtures of this invention serve effectively as a replacement for sodium caseinate on equal protein basis in the whole or in part.

Sodium caseinate formed by the alkali neutralization of casein has found broad utility in nonbutterfat dairy products.

Sodium caseinate is conventionally used in such food compositions as coffee whiteners, whipped toppings, mellorines, frozen desserts, puddings, custards, frozen cream pies, process cheese, imitation sour creams, snack dips, baby foods, instant breakfasts, and the like. While sodium caseinate generally serves a specific function in these compositions, it simultaneously serves as a nutrient additive. The mixtures of this invention can effectively replace sodium caseinate in all such food compositions although they are particularly effective in coffee whitener compositions and whipped toppings. The importance of this discovery is enhanced by the fact that the availability of whole milk and whole milk products such as casein is dwindling with increase in population, and that dry whey as recovered from waste whey has in instances in the past been unsuitable for use in such food compositions. The unsuitability of dried whey in such compositions was believed due to the partial denaturation of the protein and the large amounts of lactose present adversely affecting the functional properties of the material. The amount of the compositions of this invention used in any of the nonbutterfat dairy product compositions will vary with the amount of sodium caseinate normally used in such compositions and whether or not the sodium caseinate is partially or wholly replaced by the compositions of this invention. In any given composition, however, the compositions of this invention replace sodium caseinate on a protein basis from 50 to 100 percent based on the amount of protein available in the whey polyphosphate compositions. Sodium caseinate is normally used in food compositions in an amount of from 0.5 to about 20 percent although higher amounts can be used if desired.

The mixtures of this composition can also be used with sodium caseinate in these food compositions in a ratio of from about 0.1 to about 100 parts by weight of the mixture of this invention to from about 99.9 to about 0 parts of sodium caseinate.

Sodium caseinate serves one or more functions in various food compositions containing it. For example, in compositions containing fat or oil and water, this ingredient serves to encapsulate the oil droplets and bind water, thus stabilizing the composition and preventing separation of oil and water from the food composition. In compositions where air is blended or beaten into the mixture, sodium caseinate serves to further bind the air bubbles to the encapsulated oil or fat and water, and thus stabilize the foam, i.e., the air, water, fat system. In similarly serves to prevent or inhibit churning in certain applications.

It has been further found that in addition to replacing sodium caseinate in such food compositions per function, compositions of this invention provide to the food composition similar nutritive values based upon essential amino acid composition. This can be seen from table I following where the approximate respective constituents of amino acid, the dried whey, casein, lactalbumin and lactoglobulin are set forth. While the compositions of this invention are well suited to the nonbutterfat dairy product compositions, they can be effectively employed in any food composition, as for example in process cheese composition.

The phosphate-whey compositions of this invention are generally employed in food compositions in an amount of from about 0.05 to about 15 percent by weight, although as indicated above, the specific amounts will vary somewhat from recipe to recipe and formulation to formulation.

When used in an emulsified-type food, the whey-phosphate compositions should be employed in an amount sufficient to provide at least 0.3 percent by weight protein to the total product such as coffee whiteners in respect to demineralized whey and 0.8 percent by weight protein in respect to undemineralized whey.

TABLE I.—ESSENTIAL AMINO ACID CONTENT OF PROTEINS (Grams/100 grams of protein)

| | Arginine | Histidine | Isoleucine | Leucine | Lysine | Methionine | Phenylalanine | Threonine | Valine | Tryptophan | Tyrosine |
|---|---|---|---|---|---|---|---|---|---|---|---|
| Casein | 4.10 | 3.02 | 6.6 | 10.55 | 8.60 | 3.17 | 5.72 | 4.46 | 8.24 | 1.17 | 5.64 |
| Milk, lactalbumin | 4.00 | 2.30 | 7.50 | 12.10 | 10.50 | 2.60 | 5.00 | 6.00 | 6.60 | 2.50 | 5.30 |
| Milk, lactoglobulin | 2.90 | 1.60 | 6.80 | 15.50 | 11.30 | 3.20 | 3.70 | 5.30 | 5.88 | 1.90 | 3.70 |
| Milk, dried whey | 2.06 | 1.18 | 5.54 | 9.11 | 7.48 | 1.00 | 2.43 | 4.86 | 4.49 | 1.06 | 1.99 |

As indicated above, the compositions of this invention are directed primarily to utilization in nonbutterfat dairy products. Certain of these nonbutterfat dairy products are described in detail hereinafter. For convenience, sodium caseinate has been used as an illustrative component. It is understood, , however, that the compositions of this invention serve as total or partial replacement for this ingredient and substitution serves as example.

COFFEE WHITENERS

Coffee whiteners have been on the market for several years and have proven to be an effective substitute for whole milk and cream in coffee. Two types of coffee whiteners have been marketed: the dry and liquid form. These products have the advantage that they are less expensive than the corresponding natural dairy product. The dry form is particularly advantageous in that it requires no refrigeration, and reduces risk of spoilage. For these reasons, coffee whiteners have received a popular reception in such market areas as offices, and picnic and company supplies where refrigeration is not available or where risk of spillage is a problem. Sodium caseinate is commonly used in coffee whiteners to encapsulate the fat or oil droplets, thus preventing separation of the fat and coalescence of the droplets to form fat lakes on the surface of hot coffee. As is well known, cream often separates on the surface of hot coffee forming globules of butterfat. Thus, when properly formulated and manufactured, coffee whiteners are often superior in stability to cream.

Sodium caseinate is generally used in dry coffee whiteners in amounts of from about 5 to about 10 percent based on the total composition.

Set forth below are typical coffee whitener formulations with a range of ingredients given for each. One of these formulations is for a liquid type coffee whitener, the other for a dry type.

In the example below, the control formulation is a typical formula for coffee whiteners containing sodium caseinate.

| Coffee Whiteners, Liquid Ingredients | % (Range) |
|---|---|
| Sodium caseinate or | 0.5–5.0 |
| Phosphate-Whey mixture | 2.3–23.0 |
| Corn syrup solids | 7.5–15.0 |
| (Adjusted for phosphate-whey mixture) | 2.5–5.0 |
| Vegetable shortening | 7.5–15.0 |
| Dipotassium phosphate | 0.5–1.5 |
| Stabilizer and emulsifiers | 0–5.0 |
| Flavoring | As needed |
| Water | To bring to 100% |

| Coffee Whiteners, Dry Ingredients | % (Range) |
|---|---|
| Sodium caseinate or | 5.0–10.0 |
| Phosphate-whey mixture | 23.0–46.0 |
| Vegetable shortening | 35.0–50.0 |
| Corn syrup solids | 35.0–50.0 |
| (Adjusted for phosphate-whey mixture) | 12.0–17.0 |
| Emulsifiers and stabilizers | 0–5.0 |

| | |
|---|---|
| Dipotassium phosphate | 0.5–3.0 |
| Flavoring | As needed |

In the foregoing formulations whey-polyphosphate mixtures can be used to replace the sodium caseinate in whole or in part.

Two typical type formulations for coffee whiteners utilizing dry whey-polyphosphate mixtures are set forth below:

| Dry Whey-Polyphosphate Replacement of Sodium Caseinate Coffee Whitener (liquid) Ingredient | Percent |
|---|---|
| Phosphate-whey mixture | 9.50 |
| Corn syrup solids | 3.88 |
| Depotassium phosphate | 1.07 |
| Vegetable shortening | 10.00 |
| Stabilizer and emulsifier | 0.40 |
| Water | Balance |

| Coffee Whitener (dry) Ingredient | Percent |
|---|---|
| Phosphate-whey mixture | 38.00 |
| Hydrogenated vegetable shortening | 44.20 |
| Corn syrup solids | 15.75 |
| Mono and diglycerides | 0.50 |
| Carageenin | 0.35 |
| Dipotassium phosphate | 1.00 |
| Flavoring | 0.20 |

In the examples which follow and throughout this specification all parts and percentages given are by weight unless otherwise specified. Additionally the following terms have the following meaning throughout:

Corn syrup solids—24 DE—Powdered maltoextrin produced by spray drying low concentration corn syrup. The number letter designation refers to a 24 Dextrose equivalent.

Carageenin is a gum extracted from red seaweed (Irish Moss).

Emulsifier—In each instance the emulsifier used was a mixture of mono- and diglycerides of the fat acids containing approximately 40 percent monoglyceride Vegetable shortening—Hydrogenated vegetable oil.

It will be noted that in the various nonbutterfat dairy products set forth herein when the whey-polyphosphate mixture of this invention is used the sugar or corn syrup solids must be adjusted. This adjustment is by reduction in amount necessary and provides a savings.

EXAMPLE 1

Uniform dry mixtures of whey solids and various phosphates were prepared by placing the dry powders in a plastic bag and shaking until uniform mixtures were obtained.

Two types of commercial dry whey were employed. These wheys had the approximate compositions as follows:

| Component | % By Weight | |
|---|---|---|
| | W—1 | W—2 |
| Moisture | 4.5 | 3.0 |
| Lactose | 73.0 | 64.0 |
| Fat | 1.0 | 0.5 |
| Minerals | 9.0 | 2.5 |
| Protein | 12.5 | 30.0 |

A beneficiated liquid whey calculated on a dry basis had the following approximate composition and was designated W—3.

Approximate Composition of W—3

| | Percent |
|---|---|
| Moisture | 5.0 |
| Protein | 62.0 |
| Lactose | 30.0 |
| Mineral | 3.0 |

Phosphates evaluated were as follows:

| Phosphate no. | Phosphate |
|---|---|
| 1 | Graham's Salt (sodium polyphosphate Chain length 10–12) |
| 2 | Graham's Salt (sodium polyphosphate Chain Length 25) |
| 3 | Graham's Salt (sodium Polyphosphate Chain Length 78) |
| 4 | Potassium Polymetaphosphate (Chain length 5,000–10,000) |
| 5 | 8:1 mixture of (No. 1) and (No. 4) above. |

Dry mixtures of the polyphosphate to be evaluated and whey were utilized in a ratio of approximately 3:1 protein to phosphate by weight. This dry blend was used to prepare liquid coffee whiteners having the following formulation:

| Ingredient | Amount (%) | | |
|---|---|---|---|
| | W1 | W2 | W3 |
| Whey-Phosphate blend | 9.50 | 4.18 | 2.22 |
| Corn syrup solids | 3.88 | 9.20 | 11.16 |
| Vegetable shortening | 10.00 | 10.00 | 10.00 |
| Dipotassium phosphate | 1.00 | 1.00 | 1.00 |
| Carageenin | 0.10 | 0.10 | 0.10 |
| Mono and diglycerides | 0.15 | 0.15 | 0.15 |
| Flavoring | As needed | | |
| Water | As needed to bring to 100% | | |

Both the control and the test formulations were prepared as follows:

1. The sodium caseinate or whey/phosphate ingredient was blended with the corn syrup solids, and carageenin.
2. The dipotassium phosphate buffer was dissolved in the water.
3. The blended dry ingredients were slowly added with mixing sufficient to thoroughly disperse them in the water.
4. The shortening was added.
5. The mixture was heated with constant rapid stirring in a steam jacketed kettle to 160° F.
6. The emulsifier was added and permitted to melt.
7. The solution was then homogenized at a temperature of 160° F. in a two stage homogenizer at 2500/500 p.s.i.
8. The homogenized mixture was cooled to a temperature of 35° to 40° F. and thereafter permitted to "age" overnight at refrigerator temperatures before evaluation (approximately 40° C.).
9. When dry compositions are desired, the liquid composition is dried by such means as spray drying.

Evaluation:

Control with sodium caseinate was normal in all characteristics. No separation of the emulsion occurred during overnight aging. The viscosity, as measured on a Brookfield model HAF viscometer spindle No. 1 at 10 r.p.m. was about 70 cps. No fat droplets appeared when added to coffee at 180° F.

In respect to the test formulations, these were considered successful if they did not exhibit separation after overnight aging, they did not "feather" on addition to hot coffee and if no fat droplets appeared on the surface of the hot coffee. If any of these detrimental properties were exhibited, the sample was designated a failure.

The table which follow sets forth the results of these tests in both instant and regular coffee heated to a temperature of from about 175° F. to about 180° F. The pH of regular coffee used was 5.03—5:08. The pH of instant coffee was 5.01—5.20.

TABLE II

| Whiteners Prepared With | Coffee Regular | Instant |
|---|---|---|
| a. W-1 (No phosphate) Control | − | − |
| b. Sodium Caseinate Control | + | + |
| c. W-2 Control (No Phosphate) | − | − |
| d. W-3 Control (No Phosphate) | − | − |
| e. W-1 + Phosphate No. 1 | + | + |
| f. W-1 + Phosphate No. 2 | + | + |
| g. W-1 + Phosphate No. 3 | + | + |
| h. W-1 + Phosphate No. 4 | + | + |
| i. W-1 + Phosphate No. 5 | + | +j. W-2 + - phosphate No. 1 |
| k. W-2 + Phosphate No. 2 | + | + |
| l. W-2 + Phosphate No. 3 | + | + |
| m. W-2 + Phosphate No. 4 | + | + |
| n. W-2 + Phosphate No. 5 | + | + |
| o. W-3 + Phosphate No. 5 | + | + |

(+) Designates acceptable performance (−) Designates failure

The following description sets forth in complete detail several other nonbutterfat dairy products:

WHIPPED TOPPING BASES

Whipped toppings for desserts have been utilized in commercial bakeries for some time; it was not, however, until the advent of the commercial aerosol can that these toppings attained widespread home use. Sodium caseinate is conventionally utilized in the preparation of the whipped topping bases utilized in both the commercial toppings, liquid and dry as well as the aerosol can type. These toppings are another example of nonbutterfat dairy products made without sacrifice of flavor or aesthetic appearance, in a potential per capita availability greater than natural butterfat containing commodities. Within the provisions of this invention it has been found that the sodium caseinate can be replaced totally or partially on a protein basis in whipped topping bases to provide equal or superior results. Sodium caseinate is utilized to fulfill the same function here as in coffee whiteners, i.e., to bind water and encapsulate the oil or fat droplets thereby stabilizing the emulsion and stabilizing the foam eventually produced. Sodium caseinate is normally used in these compositions in an amount of from about 0.5 percent to about 10 percent by weight.

Representative formulations of both liquid and dry whipped topping bases are set forth below showing relative ranges of ingredients.

| Whipped Toppings, Liquid Ingredients | % (Range) |
|---|---|
| Sodium caseinate or | 0.5–5.0 |
| Phosphate-whey mixture | 2.3–23.0 |
| Sugar | 0–15.0 |
| Corn syrup solids | 0–15.0 |
| (Adjusted for phosphate-whey mixture) | 0–5.0 |
| Vegetable shortening | 20.0–40.0 |
| Stabilizer and emulsifiers | 0.2–5.0 |
| Flavor and Color | As needed |
| Water | To bring to 100% |

| Whipped Toppings, Dry Ingredients | % (Range) |
|---|---|
| Sodium caseinate or | 3.0–10.0 |
| Phosphate-whey mixture | 14.0–23.0 |
| Vegetable shortening | 50.0–70.0 |
| Sugar | 0–20.0 |
| (Adjusted for phosphate-whey mixture) | 0–7.0 |
| Corn syrup solids | 0–25.0 |
| Stabilizers, emulsifiers, buffers, flavor, color | 0–15.0 |

Polyphospate-whey mixture can be used to replace sodium caseinate totally or in part in these formulations.

The sodium caseinate, or whey-polyphosphate mixture is blended with the sugar and stabilizer. The water is placed in a steam jacketed kettle and the dry ingredients are added. The mixture is heated to a temperature of 120° F. The shortening and emulsifiers are melted together and added to the water suspension and the combined mixture is heated to a temperature of 160° F. with stirring. The hot solution is homogenized in a two-stage homogenizer at 1,500/500 p.s.i. The homogenized mixture is cooled to a temperature of 35° to 40° F. and aged overnight at this temperature. The dry composition can be prepared from the liquid composition by conventional drying techniques such as spray drying.

FROZEN DESSERTS

Another area where nonbutterfat dairy products have received public acceptance is in the area of frozen desserts such as the mellorines and "milk-type" sherbets. In these compositions sodium caseinate is normally used to bind water, encapsulate fat droplets, and stabilize air blended into the mixture. It also serves to inhibit churning. Sodium caseinate is normally used in the formulations of such frozen desserts in amounts of from about 0.1 to about 5 percent by weight total. It has been found that the sodium caseinate in such formulations can be partially or totally replaced by whey-polyphosphate mixture to give equivalent or superior results.

Set forth below is a general formulation of such frozen desserts showing the percentage range of the ingredients used.

| Frozen Desserts—Mellorines, Ice Milks, etc. Ingredients | % (Range) |
|---|---|
| Sodium caseinate or | 0.5–5.0 |
| Phosphate-whey mixture | 2.3–23.0 |
| Sugar | 0–25.0 |
| (adjusted for phosphate-whey mixture) | 0–15.0 |
| Corn syrup solids | 0–25.0 |
| (adjusted for phosphate-whey mixture) | 0–8.0 |
| Vegetable shortening | 5.0–15.0 |
| Stabilizer and emulsifiers | 0.1–3.0 |
| Flavoring, color, salt | As needed |
| Water | To bring to 100% |

The sodium caseinate or whey-polyphosphate mixture is blended with the sugar and stabilizer. The water is placed in a steam jacketed kettle and the dry ingredients are added with stirring. While stirring the corn syrup solids are added and stirred followed by the addition of the shortening, emulsifier and salt. The mixture is heated in the kettle to a temperature of 160° F. The hot solution is homogenized in a two-stage homogenizer at 2500/500 p.s.i. The homogenized liquid is cooled to a temperature of 35° to 40 F. and was aged overnight at this temperature. The aged solution is frozen in a conventional commercial ice cream freezer at 20°–25° F. and then permitted to harden at a temperature of about −10° F. for a period of about 12 hours.

IMITATION SOUR CREAM

A general formulation for imitation sour cream is as follows:

| Imitation Sour Creams Ingredients | % (Range) |
|---|---|
| Sodium caseinate or | 0.5–5.0 |
| Phosphate-whey mixture | 2.3–23.0 |
| Vegetable shortening | 10.0–25.0 |
| Sugar and/or corn syrup solids | 5.0–15.0 |
| (adjusted for phosphate-whey mixture) | 1.0–5.0 |
| Stabilizers and emulsifiers | 0.1–2.0 |
| Flavor and color | As needed |
| Water | To bring to 100% |

This formulation is prepared by the following procedure:

Procedure

Heat water to 90°–110° F. Add sodium caseinate or phosphate whey mixture and stabilizer. Mix to dissolve.

Add shortening and emulsifier.

Pasteurize with stirring at 165° F. for 30 minutes.

Homogenize twice at 2,500 p.s.i. (one stage only), keeping temperature above 160° F. during the two homogenization steps.

Cool mix to 72° F. and add the culture to be used (3 percent buttermilk or a commercial starter, following manufacturer's directions).

Maintain at 72° F. for ripening until acidity reaches 0.8 percent (18–20 hours). Cool to 35°–40° F.

IMITATION CREAM CHEESE

Sodium caseinate is an effective ingredient in the formulation of imitation cream cheese. Whey-polyphosphate mixture is an effective replacement for the sodium caseinate in whole or part.

A typical general and specific formulation for imitation cream cheese is set forth below:

| Imitation Cream Cheese Ingredients | % (Range) |
|---|---|
| Sodium caseinate or | 0.5–5.0 |
| Phosphate-whey mixture | 2.3–23.0 |
| Sugar or corn syrup solids | 5.0–15.0 |
| (adjusted for phosphate-whey mixture) | 1.0–5.0 |
| Vegetable shortening | 15.0–40.0 |
| Stabilizer and emulsifiers | 0.1–5.0 |
| Flavorings, color | As needed |
| Water | To bring to 100% |

| Imitation Cream Cheese Ingredients | Percent |
|---|---|
| Phosphate-whey (W–1) mixture | 9.50 |
| Corn syrup solids | 3.80 |
| Salt | 0.15 |
| Stabilizer and emulsifier | 2.55 |
| Vegetable shortening | 25.00 |
| Flavored acid | 0.85 |
| Water | 58.15 |

Phosphate-whey mixture can similarly effectively replace sodium caseinate in baby formulas, cream pie bases, cocoa drinks, "Instant Breakfasts," and process cheese as well as in nutrient application for soup and baby foods.

The vegetable shortening used in the formulations above and throughout the specification are hydrogenated vegetable oils. Such shortening materials are made from many oils, some being mixtures of such oils. All of which are well known in the art. Exemplary of such oils are soy bean oil, corn oil, coconut oil, peanut oil, safflower seed oil and the like. It is, of course, understood that animal fats such as those which are conventionally used as shortenings such as for example, lard, can be used herein.

Emulsifying agents used in the formulations of this invention are preferably the mono and diglycerides of the fat acids usually in admixture. However, any other food grade emulsifiers can be used.

Similarly, stabilizers other than carageenin such as tragacanth, guar, carboxymethyl cellulose and the like can be used as stabilizers.

Corn syrup solids can be replaced with any other dextrose material which provides equivalent results.

Natural and artificial sweeteners such as honey, and the cyclamates can be used in place of sugar where desired.

Similarly dipotassium phosphate is set forth herein as a buffer material. Other equivalent food grade buffer materials can be used, such as sodium phosphate and the like.

In any of the compositions of this invention such flavorings as are normally used in the art can be similarly used herein.

It is another embodiment of this invention that the whey-polyphosphate mixtures described above can be prepared in combination with the oils and fats defined above as shortenings. As indicated, vegetable shortenings are preferred in such use. Since many of the ultimate compositions in which the whey-polyphosphate compositions of the invention are employed also contain shortening, it has been found advantageous to prepare such compositions as such. Accordingly, compositions of dry whey solids and polyphosphate have been blended with shortenings and have been found to function when employed in such nonbutterfat dairy products as coffee whiteners.

In these compositions the whey-phosphate components are employed in the same ratios and amounts as are established above. The whey-polyhosphate mixture is generally employed in an amount of from about 20 to about 110 parts by weight per 100 parts by weight shortening, although amounts of from about 50 to about 80 parts have been found to be preferred for most applications.

The whey-polyphosphate-shortening composition is employed in the preparation of a nonbutterfat dairy product generally in an amount of from about 10 to about 20 percent based on the total weight of the nonbutterfat dairy composition.

EXAMPLE 2

Three compositions of whey-polyphosphate shortening were prepared as set forth below. The components were as follows:

| | |
|---|---|
| Whey | Demineralized whey having approx. 14% protein |
| Polyphosphate | Sodium hexametaphosphate having an average chain length of 12 |
| Shortening | Commercial hydrogenated vegetable shortening |

| Composition A | Parts by Weight | Weight % |
|---|---|---|
| Shortening | 100.00 | 82.64 |
| Dry whey | 20.00 | 16.53 |
| Phosphate | 1.00 | 0.83 |

| Composition B | Parts by Weight | Weight % |
|---|---|---|
| Shortening | 100.00 | 66.67 |
| Dry whey | 47.80 | 31.87 |
| Phosphate | 2.20 | 1.46 |

| Composition C | Parts by Weight | Weight % |
|---|---|---|
| Shortening | 100.00 | 48.78 |
| Dry whey | 100.00 | 48.78 |
| Phosphate | 5.00 | 2.44 |

A coffee whitener composition for the whey-phosphate-shortening composition is as follows:

| Component | General Range | Preferred Range |
|---|---|---|
| | Parts by Weight | |
| Whey-polyphosphate-shortening | 10–20 | 15–17 |
| Corn sugar | 0–12 | 6–9 |
| Dipotassium phosphate | 1.0 | 1.0 |
| Emulsifier (mono and diglycerides) | 0.10 | 0.10 |
| Water | Sufficient to balance to 100 parts by weight | |

Homogenizing pressures as in the case of all coffee whitener compositions are from about 500 to about 4,000 p.s.i.

Liquid coffee whitener compositions were prepared for each of compositions A, B and C above employing the preferred range of ingredients in the composition. The compositions in each instance were excellent. Neither "feathring" nor oil separation were observed. The flavor was acceptable to taste.

It has also been found and is an additional embodiment of this invention that dried egg white normally employed in certain baked goods can be replaced up to 50 percent by dried demineralized whey-phosphate mixture with no detrimental effects on performance. Particularly preferred in this application is sodium polyphosphate having an approximate average chain length of about 12.

Accordingly, it has been found that compositions of dried egg albumin containing from about one to about 100 parts of a mixture of demineralized dry whey containing a minimum of 25 percent protein and polyphosphate per hundred parts by weight dried egg white can be effectively employed in general baked goods normally containing egg white, without detrimental effect.

In specialty baked goods such as angel food cake wherein a large amount of egg white is normally employed, a mixture of from about 0.5 to about 10.0 parts dry demineralized whey-polyphosphate mixture per 100 parts albumin are employed.

Considering the high cost of dried egg albumin even the minimal amounts of replacement by the dried demineralized whey-polyphosphate compositions of this invention provide substantial savings in large volume production bakery products.

While any of the whey-polyphosphate dry blends employing demineralized whey containing at least 25 percent protein as defined above can be employed with dried egg albumin, it is preferred to employ a whey-polyphosphate mixture having a protein to phosphate ratio of from about two to one to about four to one and most preferred from about 2.5 to one to about 3.5 to one.

The dry whey-phosphate/egg albumin mixture can effectively replace dried egg albumin with no detrimental effect upon performance.

In a typical white bakery cake replacement of 50 percent dried egg albumin with a dry blend of demineralized whey and sodium hexametaphosphate having an approximate average chain length of 12 in a protein to phosphate ratio of three to one produced cakes having the following specific volume:

| Sample | Specific Volume cc./gram. |
|---|---|
| Control (Dried egg white) | 2.72 |
| 5% [dry demineralized whey-sodium hexametaphosphate 3:1 protein to phosphate ratio] and 50% dried egg albumin | 2.8 |

In angel food cake it was found that 10 percent of dried egg albumin replaced by a dry blend of demineralized whey and sodium hexametaphosphate in a protein to phosphate ratio of 3:1 produced cakes with the following specific volume:

| Sample | Specific Volume cc./gram. |
|---|---|
| Control (100% dried egg albumin) | 6.46 |
| Sample with 10% replacement | 6.48 |

From the foregoing it can be seen that the partial replacement of dried egg white had no detrimental effect on the specific volume of the cakes.

A typical bakery cake formulation and one in which a portion of the egg white is replaced is set forth below:

| Ingredient | Control % | Test |
|---|---|---|
| | Amounts | |
| Flour | 25.52 | 25.52 |
| Salt | 0.89 | 0.89 |
| Baking powder | 1.47 | 1.47 |
| Nonfat dry milk (low heat) | 3.50 | 3.50 |
| Sugar | 32.48 | 30.38 |
| Shortening | 12.76 | 12.76 |
| Dried egg albumin | 2.18 | 1.09 |
| Demineralized whey (W–2) | | 2.90 |
| Sodium hexametaphosphate | | 0.29 |
| Water | 21.20 | 21.20 |
| | 100.00 | 100.00 |

The cake was prepared as follows:
1. Blend dry ingredients.
2. Add shortening and mix until evenly distributed.
3. Add dried egg white or demineralized whey 25 percent or more protein/phosphate mix until throughly blended.
4. Add water mix until batter is smooth.
5. Bake in greased-floured, lined cake pan at 375° F. or 20 minutes.

An angel food cake mix was prepared in two parts as follows:

Mixture A

| Ingredient | Control % | Test % |
|---|---|---|
| sugar | 9.80 | 8.69 |
| dried egg albumin | 5.77 | 5.19 |
| demineralized whey (W–2) | | 1.54 |
| sodium hexametaphosphate | | 0.15 |
| soy protein | 0.52 | 0.52 |
| Cream of Tartar | 0.39 | 0.39 |
| salt | 0.13 | 0.13 |

Mixture B

| | | |
|---|---|---|
| sugar | 25.94 | 25.94 |
| starch | 8.34 | 8.34 |
| flour | 6.34 | 6.34 |
| soda | 0.15 | 0.15 |
| salt | 0.13 | 0.13 |
| corn sugar | 0.84 | 0.84 |
| Cream of Tarter | 0.13 | 0.13 |
| water | 41.52 | 41.52 |

Directions
1. Pour water into mixing bowl, add a mix blend 1 minute at low speed, mix at high speed until peaks are formed.
2. Blend in mix at low speed.
3. Bake in appropriate size angel food cake pan for 25 minutes at 375° F.
4. Invert pan to cool before removing cake.

Dry demineralized whey as employed herein has had a portion of the naturally occurring minerals removed by such techniques as dialysis, electrodialysis, ion exchange or the like. For purposes of this invention demineralized whey preferably contains no greater amount than 5 percent minerals based on the dry whey composition and most preferably less than 3.5 percent. Demineralized whey is typified and illustrated by W—2 above.

Clearly, many variations and modifications are within the scope and spirit of this invention and therefore no unnecessary limitations should be implied from the foregoing specification.

What is claimed is:

1. A food additive composition consisting essentially of dry particulate mixture of dry whey solids and from one percent to about 40 percent by weight based on the percent whey protein of an alkali metal polyphosphate having a $P_2O_5$ content in excess of 66 weight wherein said alkali metal has a molecular weight greater than 10 and less than 50.

2. The composition of claim 1 wherein the alkali metal is sodium.

3. The composition of claim 1 wherein the alkali metal is potassium.

4. The composition of claim 1 wherein the linear alkali metal polyphosphate is Graham's salt.

5. The composition of claim 1 wherein the linear alkali metal polyphosphate is present in an amount of from about 10 percent to about 40 percent.

6. The composition of claim 5 wherein the alkali metal linear polyphosphate is sodium polyphosphate.

7. The composition of claim 1 wherein the linear alkali metal polyphosphate is present in an amount of from about 25 to about 35 percent by weight.

8. The composition of claim 1 wherein the linear alkali metal polyphosphate is sodium polyphosphate having an average chain length from about 12 to about 35 inclusive.

9. A food composition containing from about 0.05 to about 15 percent of the composition of claim 1.

10. A food composition containing from about 0.05 to about 15 percent by weight of the composition of claim 6.

11. The composition of claim 10 wherein the hood composition is a coffee whitener.

12. A composition comprising shortening and from about 20 to 110 parts by weight per 100 parts by weight shortening of a composition of dried whey and an alkali metal polyphosphate having a $P_2O_5$ content in excess of 66 percent wherein said alkali metal has a molecular weight greater than 10 and less than 50, said whey polyphosphate mixture having a protein to phosphorus ratio of from about 5:1 to about 2:1.

13. A composition of claim 12, wherein the whey phosphate mixture is present in an amount from about 50 to about 80 parts by weight per 100 parts by weight shortening.

14. A composition of claim 12, wherein the whey employed is a demineralized whey containing less than 5 percent by weight of the total dry whey composition of the naturally occurring whey minerals.

15. A composition comprising dried egg white and from about one to about 100 parts by weight per 100 parts dried egg white of a composition comprising demineralized whey containing no more than five parts by weight of the naturally occurring whey minerals based on the total dry whey composition and an alkali metal polyphosphate having a $P_2O_5$ content in excess of 66 percent, wherein said alkali metal has a molecular weight greater than 10 and less than 50, said whey phosphate composition having a protein to phosphate ratio of from about 5:1 to about 2:1.

16. The composition of claim 15 wherein the demineralized whey contains less than 3.5 parts by weight of the naturally occurring whey minerals based on the total composition of the dry whey and wherein the alkali metal polyphosphate is sodium hexametaphosphate having an approximate average chain length of 12.

17. A nonbutterfat dairy composition normally containing sodium caseinate selected from the group consisting of coffee whiteners, whipped toppings, mellorines, frozen desserts, puddings, custards, frozen cream pies, process cheese, imitation sour cream, snack dips, baby foods, and instant breakfasts, wherein from about 1 to 100 percent by weight protein basis of sodium caseinate requirement has been replaced by the composition of claim 1, said replacement being in an amount sufficient to provide the functional equivalence of the replaced sodium caseinate.

18. The composition of claim 17 wherein the nonbutterfat dairy product is a coffee whitener.

19. A method for providing a food composition normally containing sodium caseinate which comprises replacing at least a part of the sodium caseinate requirement of said food composition with a dry particulate mixture of dry whey solids and from 1 to about 40 percent by weight based on the percent whey protein of an alkali metal polyphosphate having a $P_2O_5$ content in excess of 66 percent wherein said alkali metal has a molecular weight greater than 10 and less than 50, said replacement being in an amount sufficient to provide the functional equivalents of said replaced sodium caseinate.

20. The method as recited in claim 19 wherein the alkali metal polyphosphate is Graham's salt.

21. A method as recited in claim 19 wherein the alkali metal polyphosphate is present in an amount of from about 10 percent to about 40 percent by weight.

22. The method as recited in claim 19 wherein the alkali metal polyphosphate is sodium polyphosphate having an average chain length from about 12 to about 35 inclusive.

23. The method as recited in claim 19 wherein said food composition is selected from the group consisting of coffee whiteners, whipped toppings, mellorines, frozen desserts, puddings, custards, frozen cream pies, processed cheese, imitation sour creams, snack dips, baby foods, and instant breakfasts.

* * * * *

FO-1050
(5/69)

UNITED STATES PATENT OFFICE
CERTIFICATE OF CORRECTION

Patent No. 3,620,757          Dated November 16, 1971

Inventor(s) Rudolph H. Ellinger and Mark G. Schwartz

It is certified that error appears in the above-identified patent and that said Letters Patent are hereby corrected as shown below:

Column 1, line 74, after the words "residual from the" insert --milk--.

Column 2, line 1, after the word "contains" insert --soluble--; line 4, after the word "whey" insert --will--.

Columns 3 and 4, TABLE I, last line, column "Leucine" the figure "9.11" should read --9.10--.

Column 5, line 39, the word "maltoextrin" should read --maltodextrin--; line 40, the word "number" should read --numeral--.

Column 6, line 8, the words "Phosphates evaluated were as follows:" should be moved down; line 39, the word "Flavoring" should be aligned with "As needed"; line 40, the word "Water" should be aligned with "As needed to bring to 100%".

Column 7, line 4, the figures "5.03-5:08" should read --5.03-5.08--; TABLE II, under the column "Instant" delete "j. W-2 + Phosphate No. 1" and insert --+--; TABLE II, under the column "Regular" insert --+-- for "j."; TABLE II, under the column "Whiteners Prepared With" insert after "i." --j. W-2 + Phosphate No. 1--.

Column 8, line 11, the word "Polyphospate-whey" should read --Polyphosphate-whey--.

Column 11, line 17, the word "feathring" should read --feathering--; line 22, after "50 percent by" insert --weight by--; line 23, the word "whey-phosphate" should read --whey-polyphosphate--; line 65, the words "5%/dry demineralized whey-sodium" should read --50%/dry demineralized whey-sodium--; line 66, the figure "2.8" should read --2.78--.

UNITED STATES PATENT OFFICE
CERTIFICATE OF CORRECTION

Patent No. 3,620,757      Dated November 16, 1971

Inventor(s) Rudolph H. Ellinger and Mark G. Schwartz

PAGE - 2

It is certified that error appears in the above-identified patent and that said Letters Patent are hereby corrected as shown below:

Column 13, line 5, Claim 1, after the word "of" insert --a--.
           line 32, Claim 11, the word "hood" should read --food--.
Column 14, line 19, Claim 17, after "from about 1 to" insert --about--; line 20, Claim 17, after the word "of" insert --the--.

Signed and sealed this 26th day of September 1972.

(SEAL)
Attest:

EDWARD M. FLETCHER, JR.
Attesting Officer

ROBERT GOTTSCHALK
Commissioner of Patents